(12) United States Patent
Hasegawa et al.

(10) Patent No.: US 7,187,266 B2
(45) Date of Patent: Mar. 6, 2007

(54) SWITCH DEVICE

(75) Inventors: Hiroyasu Hasegawa, Aichi (JP); Kiyokazu Ohtaki, Aichi (JP); Tomoyuki Funayama, Toyota (JP); Koji Iwamoto, Aichi-ken (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 152 days.

(21) Appl. No.: 10/821,321

(22) Filed: Apr. 9, 2004

(65) Prior Publication Data
US 2004/0206610 A1 Oct. 21, 2004

(30) Foreign Application Priority Data
Apr. 16, 2003 (JP) .............................. 2003-111938

(51) Int. Cl.
G06K 19/00 (2006.01)
B60R 25/00 (2006.01)
B60R 25/04 (2006.01)

(52) U.S. Cl. .................. 340/5.62; 340/5.72; 307/10.2; 307/10.3

(58) Field of Classification Search ............... 340/5.62, 340/5.72
See application file for complete search history.

(56) References Cited

U.S. PATENT DOCUMENTS

| | | | | |
|---|---|---|---|---|
| 5,729,057 A | * | 3/1998 | Frenzel et al. ............. | 307/10.3 |
| 5,734,330 A | * | 3/1998 | Nakamura .................. | 307/10.2 |
| 5,973,411 A | * | 10/1999 | Tado et al. .................. | 180/287 |
| 5,982,295 A | | 11/1999 | Goto et al. | |
| 6,188,140 B1 | * | 2/2001 | Kito et al. .................. | 307/10.2 |
| 6,218,932 B1 | * | 4/2001 | Stippler ..................... | 307/10.2 |
| 6,510,517 B1 | * | 1/2003 | Bruhnke et al. ............. | 713/168 |
| 6,776,016 B1 | * | 8/2004 | Wittwer et al. ............... | 70/252 |
| 6,816,059 B2 | * | 11/2004 | Yanaka ....................... | 340/5.72 |
| 6,937,136 B2 | * | 8/2005 | Greenwood et al. ....... | 340/5.61 |
| 2004/0207516 A1 | * | 10/2004 | Ohtaki et al. ............... | 340/438 |

FOREIGN PATENT DOCUMENTS

| | | |
|---|---|---|
| DE | 4435894 A | 4/1996 |
| EP | 0685620 A | 12/1995 |
| EP | 0846820 A | 6/1998 |
| EP | 1279576 A | 1/2003 |
| JP | 2002-188505 | 7/2002 |

* cited by examiner

Primary Examiner—Wendy R. Garber
Assistant Examiner—Clara Yang
(74) Attorney, Agent, or Firm—Patterson, Thuente, Skaar & Christensen, P.A.

(57) ABSTRACT

A switch device that occupies less space and that can be manufactured at a lower cost. The switch device includes an operation switch operated by an operator for driving an actuator and a coil antenna used to output a transponder-driving radio wave. The coil antenna is arranged adjacent to the operation switch.

10 Claims, 4 Drawing Sheets

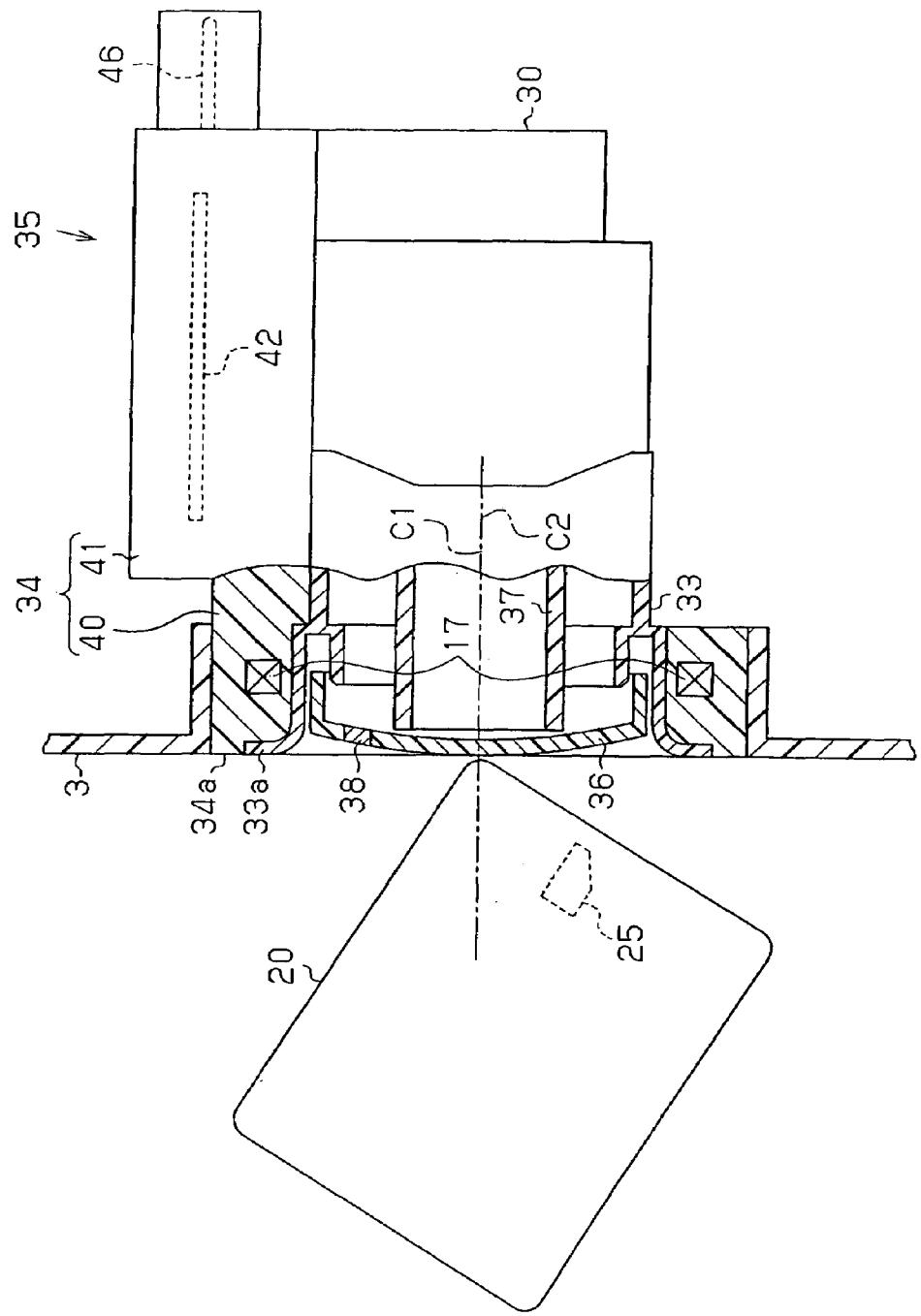

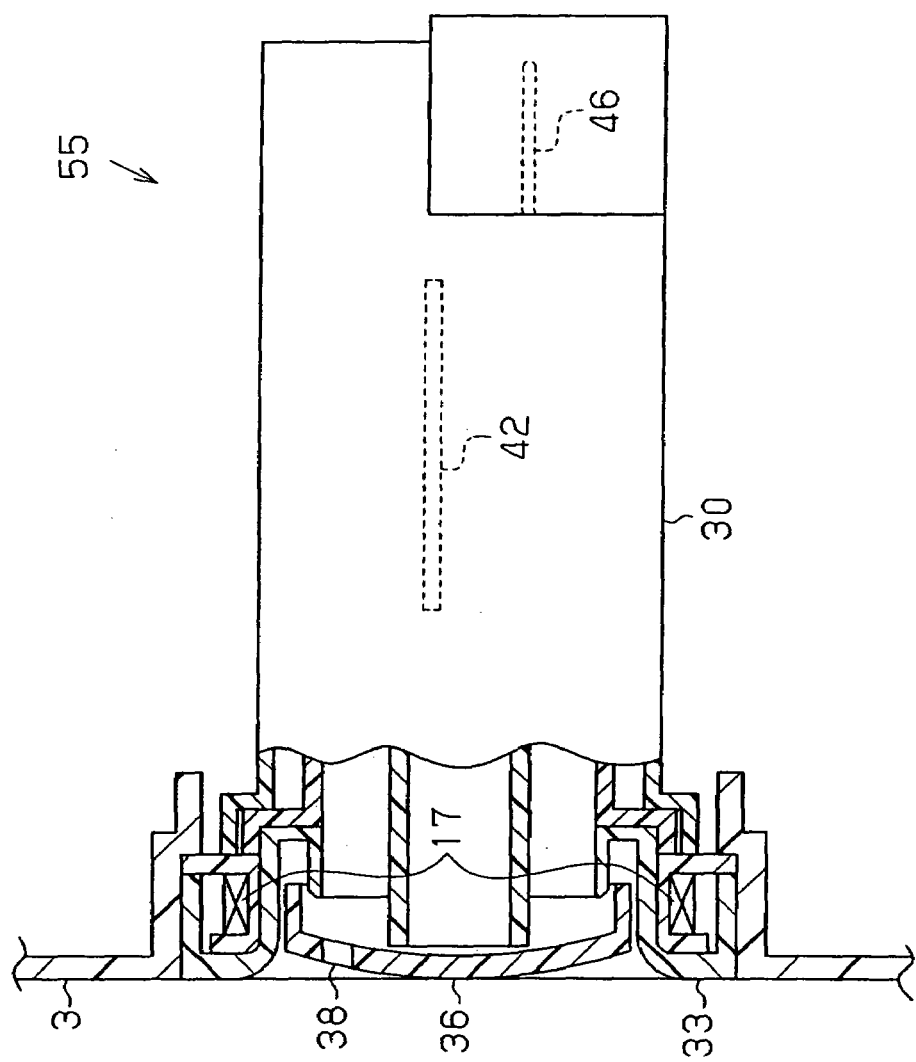

SWITCH DEVICE

BACKGROUND OF THE INVENTION

The present invention relates to a switch device, and in particular, to a switch device including a switch operated to drive a device mounted on a subject, a security system, and a switch operation method.

To prevent vehicles from being stolen, portable devices, which transmit an ID code signal including an ID code, have recently been used instead of conventional mechanical keys. Such a portable device is held by an owner (driver) of a vehicle. A "smart ignition" function has been proposed, which enables the engine of a vehicle to be started based on an ID code signal wirelessly transmitted from the portable device. As one example, Japanese Laid-Open Patent Publication No. 2002-188505 describes an engine controller for vehicles with the smart ignition function.

In a vehicle with the smart ignition function, for example, a push-button ignition switch and a portable device slot, into which a portable device is inserted, are installed on the instrument panel in the passenger compartment. Normally, the portable device, held, for example, in a pocket of the owner's clothing, mutually communicates with the vehicle by automatically transmitting an ID code signal to the vehicle. The vehicle enables its engine to start on the condition that an ID code included in the ID code signal transmitted from the portable device matches an ID code preset for the vehicle. When the owner presses the ignition switch in this state, a starter motor is driven to start the engine of the vehicle.

When the portable device does not automatically transmit the ID code signal due to, for example, voltage decrease of its battery, the owner can use the portable device slot to start the engine. In more detail, the owner inserts the portable device in the portable device slot so that a transponder in the portable device receives a driving radio wave transmitted from the portable device slot. The transponder then supplies the vehicle with a transponder signal including an ID code for the transponder (transponder code). The vehicle compares the transponder code with the ID code of the vehicle.

As described above, the portable device slot installed in the passenger compartment of the vehicle is not normally used but is used only in an emergency such as when the battery of the portable device is drained. Nevertheless, sufficient space for the portable device slot, which has a holding mechanism for holding the portable device, needs to be provided in the vehicle. In recent years, however, vehicle systems have been rapidly computerized and have become provided with more functions. This has increased the number of electric and electronic components used in vehicles. Thus, it has become extremely difficult to provide sufficient space for the portable device slot within the limited space of the vehicle. Further, the portable device slot is composed of a large number of components including the portable device holding mechanism and a coil antenna, which outputs a transponder-driving radio wave. This increases the manufacturing cost of a device with the smart ignition function.

SUMMARY OF THE INVENTION

The present invention provides a switch device that occupies less space and is manufactured at a lower cost.

The present invention provides a switch device for use by an operator and connection to an actuator, for enabling the actuator to be driven when an ID code transmitted from a transponder of a portable device matches a predetermined ID code of a vehicle controller. The switch device transmits a transponder-driving radio wave that causes the transponder to generate electromotive force for transmitting the ID code. The switch device includes an operation switch operated by the operator for driving the actuator. A coil antenna is used for transmitting the transponder-driving radio wave. The coil antenna is arranged adjacent to the operation switch.

A further aspect of the present invention is a switch device for use by an operator and connection to an actuator, for enabling the actuator to be driven when an ID code transmitted from a transponder of a portable device matches a predetermined ID code of a vehicle controller. The switch device transmits a transponder-driving radio wave that causes the transponder to generate electromotive force for transmitting the ID code. The switch device includes an operation switch having an operational surface operated by the operator for driving the actuator. A coil antenna is used for transmitting the transponder-driving radio wave. The coil antenna is arranged adjacent to the operational surface.

A further aspect of the present invention is a switch device for use by an operator and connection to an actuator, for enabling the actuator to be driven when an ID code transmitted from a transponder of a portable device matches a predetermined ID code of a vehicle controller. The switch device transmits a transponder-driving radio wave that causes the transponder to generate electromotive force for transmitting the ID code. The switch device includes an operation switch having an operational surface operated by the operator for driving the actuator. A switch holder, having a ring that surrounds the operational surface, holds the operation switch. A coil antenna is used for transmitting the transponder-driving radio wave. The coil antenna is arranged near the operational surface of the operation switch and in the ring.

A further aspect of the present invention is a security system for use by an operator and for controlling driving of an actuator. The security system enables the actuator to be driven when an ID code transmitted from a transponder matches a predetermined ID code. The security system transmits a transponder-driving radio wave that causes the transponder to generate electromotive force for transmitting the ID code. The security system has a portable device including the transponder, an operation switch operated by the operator to drive the actuator, and a coil antenna used for transmitting the transponder-driving radio wave. The coil antenna is arranged adjacent to the operation switch.

A further aspect of the present invention is a security system for use by an operator and for controlling driving of an actuator. The security system includes an operation switch operated by the operator for driving the actuator. A request signal output unit transmits a request signal. A portable device includes a transponder for transmitting a transponder signal including a first ID code. The security system enables the actuator to be driven when the first ID code transmitted from the transponder matches a predetermined second ID code. The security system transmits a transponder-driving radio wave that causes the transponder to generate electromotive force for transmitting the first ID code. The portable device transmits an ID code signal including a third ID code in response to the request signal transmitted from the request signal output unit. A first determination unit determines whether the third ID code included in the ID code signal transmitted from the portable device matches a preset fourth ID code. A first control unit enables the actuator to be driven when the first determination unit determines that the third ID code and the fourth ID code match. A second determination unit determines whether the first ID code included in the transponder signal transmitted from the transponder of the portable device matches the second ID code. A second control unit enables the actuator to be driven when the second determination unit determines that the first ID code and the second ID code match. A coil antenna is used to transmit the transponder-driving radio wave. The coil antenna is arranged adjacent to the operation switch.

A further aspect of the present invention is a method for operating an operation switch to drive an actuator. The actuator is enabled to be driven when an ID code transmitted from a transponder of a portable device matches a predetermined ID code. The transponder receives a transponder-driving radio wave that generates electromotive force used to transmit the ID code. A coil antenna used to output the transponder-driving radio wave is arranged adjacent to the operation switch. The method includes operating the operation switch while holding the portable device in a vicinity of the operation switch.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4 is a partial cross-sectional view of the switch device of FIG. 3; and

FIG. 5 is a partial cross-sectional view of a switch device according to a further embodiment of the present invention.

DETAILED DESCRIPTION OF THE PREFERRED EMBODIMENTS

Figure 1:
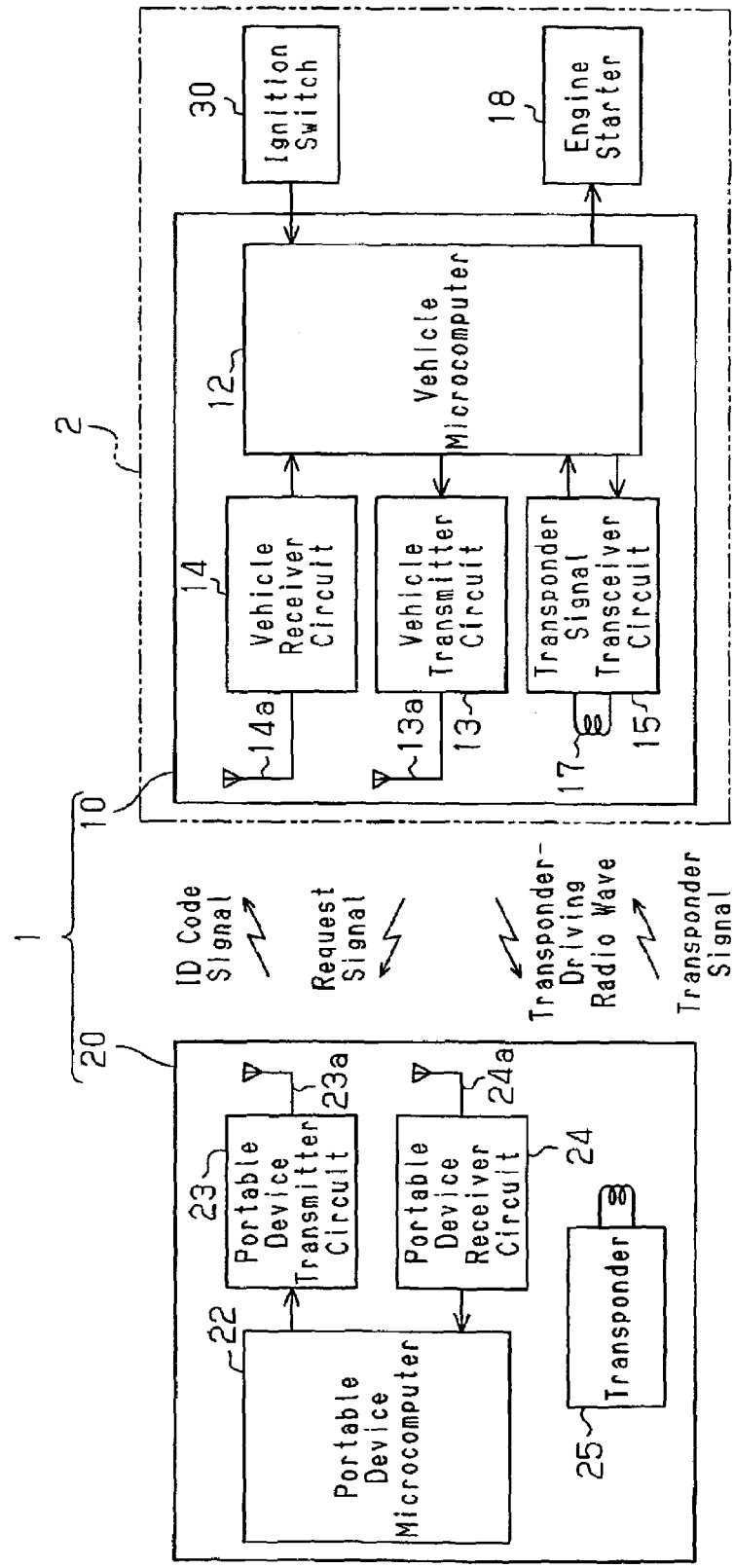
FIG. 1 is a schematic block diagram of a security system according to a preferred embodiment of the present invention.

In the drawings, like numerals are used for like elements throughout.

A switch device 35 and a security system 1 according to a preferred embodiment of the present invention will now be described with reference to FIGS. 1 to 4.

As shown in FIG. 1, the security system 1 includes a vehicle controller 10 that is mounted on a vehicle 2, and a portable device 20 that is separate from the vehicle 2. The portable device 20 is held by an owner (driver) of the vehicle 2. The vehicle controller 10 transmits a request signal and a transponder-driving radio wave. The portable device 20 transmits an ID code signal and a transponder signal.

The vehicle controller 10 includes a vehicle microcomputer 12, a vehicle transmitter circuit 13, a vehicle receiver circuit 14, and a transponder signal transceiver circuit 15. Each of the vehicle transmitter circuit 13, the vehicle receiver circuit 14, and the transponder signal transceiver circuit 15 is connected to the vehicle microcomputer 12. A transmitter antenna 13a is connected to the vehicle transmitter circuit 13. A coil antenna 17, which functions as a transceiver antenna, is connected to the transponder signal transceiver circuit 15. A receiver antenna 14a, which receives an ID code signal from the portable device 20, is connected to the vehicle receiver circuit 14.

In the preferred embodiment, the vehicle microcomputer 12 functions as a request signal output unit, a first determination unit, a second determination unit, a first control unit, and a second control unit.

The vehicle microcomputer 12, functioning as the request signal output unit, provides the portable device 20 with a request signal by using the vehicle transmitter circuit 13. The vehicle microcomputer 12 has a memory (not shown) storing an ID code unique to the owner's vehicle 2 (ID code that differs depending on each vehicle).

The vehicle microcomputer 12 intermittently provides the vehicle transmitter circuit 13 with a request signal. The vehicle transmitter circuit 13 converts the electric request signal transmitted from the vehicle microcomputer 12 into a radio wave with a predetermined frequency and transmits the radio wave to the vehicle 2 via the transmitter antenna 13a. Also, the vehicle microcomputer 12 provides the transponder signal transceiver circuit 15 with a transponder-driving signal. The transponder signal transceiver circuit 15 converts the electric transponder-driving signal transmitted from the vehicle microcomputer 12 into a radio wave with a predetermined frequency to generate a transponder-driving radio wave. The transponder signal transceiver circuit 15 transmits the transponder-driving radio wave to a predetermined area in the passenger compartment via the coil antenna 17.

The vehicle receiver circuit 14 receives an ID code signal from the portable device 20 via the receiver antenna 14a. The vehicle receiver circuit 14 demodulates the ID code signal received from the portable device 20 to a pulse signal to generate a receiver signal. The vehicle receiver circuit 14 transmits the receiver signal to the vehicle microcomputer 12. The transponder signal transceiver circuit 15 receives a transponder signal from the portable device 20 via the coil antenna 17. The transponder signal transceiver circuit 15 demodulates the transponder signal received from the portable device 20 to a pulse signal to generate a receiver signal and provides the vehicle microcomputer 12 with the receiver signal.

An ignition switch 30 (operation switch) installed in the passenger compartment is electrically connected to an input terminal of the vehicle microcomputer 12. An engine starter 18 (actuator) is electrically connected to an output terminal of the vehicle microcomputer 12. The engine starter 18 automatically starts the engine (actuated device) upon receipt of a start signal from the vehicle microcomputer 12.

The vehicle microcomputer 12, functioning as the first determination unit, compares an ID code prestored in its memory with an ID code included in an ID code signal (data signal) received from the portable device 20 to determine whether the two ID codes match. When determining that the two ID codes match, the vehicle microcomputer 12, functioning as the first control unit, provides the engine starter 18 with a start signal or a stop signal in response to an ON signal or an OFF signal provided from the ignition switch 30. In this way, the vehicle microcomputer 12 validates the operation of the ignition switch 30. Here, "validation of the operation of the ignition switch 30" is intended to mean enabling the starting of the stopped engine, or enabling the stopping of the running engine in the vehicle 2 when a push button 36 of the ignition switch 30 is pressed.

When determining that the two ID codes do not match, the vehicle microcomputer 12 does not provide the engine starter 18 with a start signal or a stop signal even upon receipt of an ON signal or an OFF signal from the ignition switch 30. In this way, the vehicle microcomputer 12 invalidates the operation of the ignition switch 30. Here, "invalidation of the operation of the ignition switch 30" is intended to mean disabling the starting of the stopped engine or disabling the stopping of the running engine in the vehicle 2 even when the push button 36 of the ignition switch 30 is pressed.

The vehicle microcomputer 12, functioning as the second determination unit compares a transponder ID code, pre-stored in its memory (hereafter simply referred to as a "transponder code"), with a transponder code included in a transponder signal transmitted from the transponder 25 to determine whether the two transponder codes match. When determining that the two transponder codes match, the vehicle microcomputer 12, functioning as the second control unit, provides the engine starter 18 with a start signal or a stop signal in response to an ON signal or an OFF signal provided from the ignition switch 30. In this way, the vehicle microcomputer 12 validates the operation of the ignition switch 30.

When determining that the two transponder codes do not match, the vehicle microcomputer 12 does not provide the engine starter 18 with a start signal or a stop signal even upon receipt of an ON signal or an OFF signal from the ignition switch 30. In this way, the vehicle microcomputer 12 invalidates the operation of the ignition switch 30.

The portable device 20 includes a portable device microcomputer 22. The portable device microcomputer 22 receives a request signal transmitted from the vehicle microcomputer 12 and determines whether the received request signal has been issued by the owner's vehicle 2. Only when determining that the request signal has been issued by the owner's vehicle 2, the portable device microcomputer 22 provides the vehicle controller 10 with an ID code signal by using a portable device transmitter circuit 23. The ID code signal includes a unique ID code that enables the owner's vehicle 2 to be distinguished from other vehicles. The ID code is stored in a memory of the portable device microcomputer 22.

The portable device 20 includes the portable device transmitter circuit 23 and a portable device receiver circuit 24, each of which is connected to the portable device microcomputer 22. A transmitter antenna 23a is connected to the portable device transmitter circuit 23 for transmitting an ID code signal. A receiver antenna 24a is connected to the portable device receiver circuit 24 for receiving a request signal from the vehicle 2. The portable device microcomputer 22 provides the portable device transmitter circuit 23 with an ID code signal. The portable device transmitter circuit 23 converts the electric ID code signal transmitted from the portable device microcomputer 22 into a radio wave with a predetermined frequency, and transmits the radio wave via the transmitter antenna 23a. The portable device receiver circuit 24 demodulates the request signal transmitted from the vehicle 2 to a pulse signal to generate a receiver signal and provides the portable device microcomputer 22 with the receiver signal.

The portable device 20 includes a transponder 25. The transponder 25 is used in an emergency when a battery, which functions as a power source for the portable device microcomputer 22 is drained. The transponder 25 transmits a transponder signal to the vehicle controller 10. The transponder signal includes a unique transponder code that enables the owner's vehicle 2 to be distinguished from other vehicles. Under a predetermined condition, the vehicle controller 10 generates a transponder-driving radio wave, which is an electromagnetic field. When the transponder 25 is located in a communication area where the electromagnetic field is being generated (communicable area), a coil included in the transponder 25 generates electromotive force. In this state, the transponder 25 uses the electromotive force of the coil to transmit a transponder signal including a transponder code.

Figure 2:
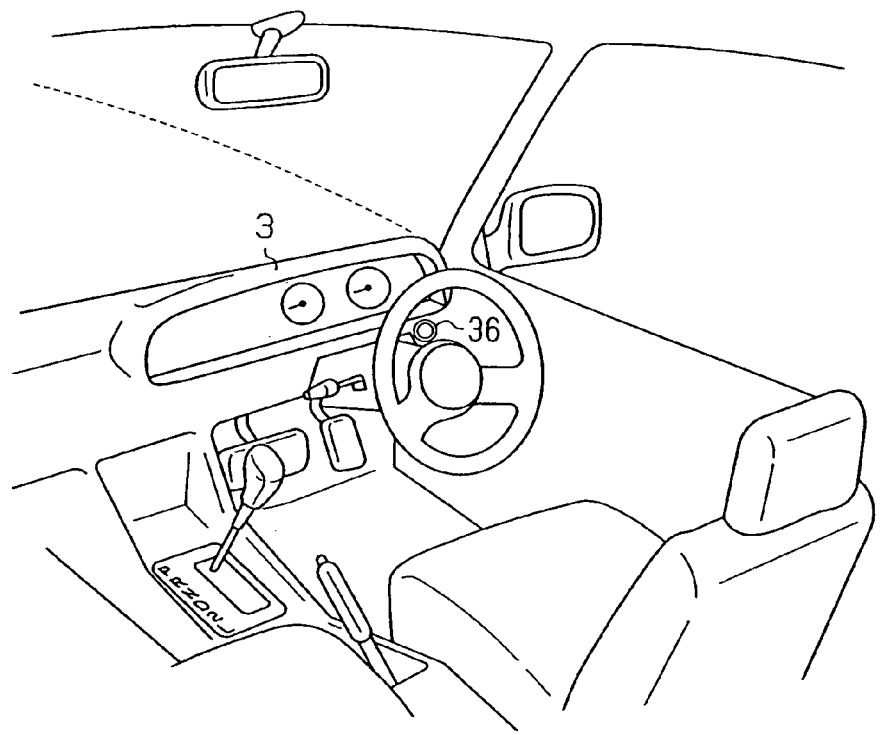
FIG. 2 is a perspective view from a passenger compartment showing an instrument panel.
Figure 3:
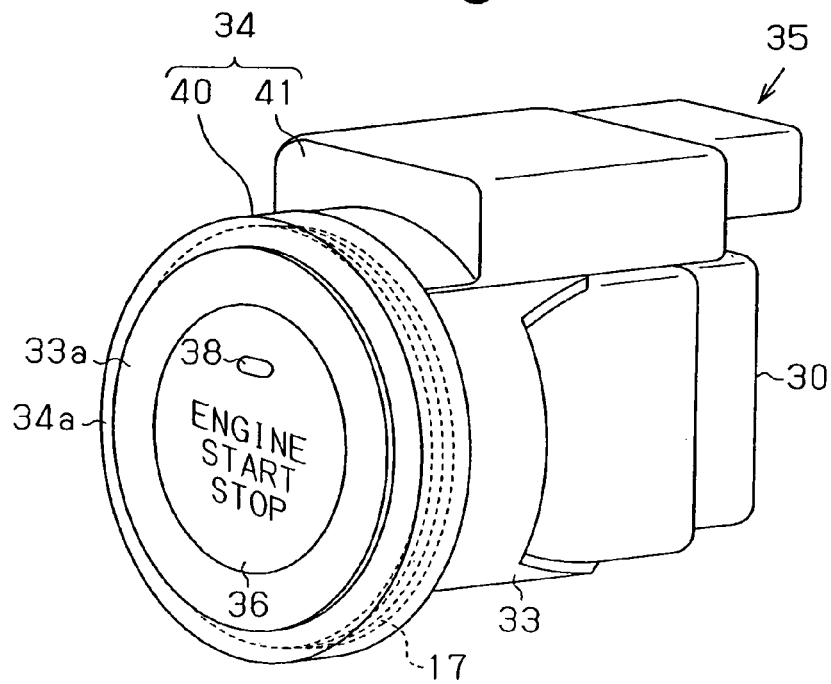
FIG. 3 is a perspective view showing the switch device according to the preferred embodiment of the present invention.

As shown in FIG. 2, the push button 36 of the ignition switch 30 is arranged on an instrument panel 3 in front of the driver's seat. The ignition switch 30 is alternately switched on and off by pressing the push button 36. As shown in FIGS. 3 and 4, a display portion 38 including an LED (not shown) is provided on the surface (operational surface) of the push button 36.

As shown in FIGS. 3 and 4, the switch device 35 includes an ignition switch 30, a bezel 33, and a switch holder 34.

The ignition switch 30 includes the push button 36, an extension member 37, and a switch (not shown). The extension member 37 is arranged between the push button 36 and the switch. When the push button 36 is pressed, the extension member 37 moves together with the push button 36, to actuate the switch.

The ignition switch 30 is arranged inside the bezel 33, which is substantially cylindrical. The bezel 33 is made of resin. The surface of the bezel 33 is furnished with decorative plating. Further, the bezel 33 has an outwardly bent peripheral portion 33a. The push button 36 of the ignition switch 30 is movably arranged in the bezel 33 so that the push button 36 is surrounded by the peripheral portion 33a of the bezel 33. The peripheral portion 33a of the bezel 33 is engaged with an outer peripheral surface 34a of the switch holder 34. The switch device 35 is installed in a manner that the peripheral portion 33a of the bezel 33 and the push button 36 of the ignition switch 30 are exposed from the instrument panel 3.

The switch holder 34 holds the bezel 33 and the ignition switch 30. The switch holder 34 has an annular ring 40 to which the bezel 33 is fitted. An annular coil antenna 17 is arranged inside the ring 40. The coil antenna 17 is arranged along the outer rim of the push button 36 of the ignition switch 30. The coil antenna 17 is arranged in such a manner that the axis C2 of the coil antenna 17 and the axis line C1 of the ignition switch 30 lie substantially along the same line. The coil antenna 17 outputs a transponder-driving radio wave to a communication area formed in the vicinity of the push button 36 of the ignition switch 30. When the transponder 25 of the portable device 20 is located in the communication area, the transponder-driving radio wave causes the coil in the transponder 25 to generate an electromotive force.

A substrate housing 41 extends from one end of the ring 40 along the axis C1 and is adjacent to the ignition switch 30. A circuit substrate 42 is arranged in the substrate housing 41. The circuit substrate 42 has, for example, a lighting circuit and a demodulation circuit. The lighting circuit controls lighting of the LED of the display portion 38. The demodulation circuit amplifies and demodulates the transponder signal transmitted from the transponder 25 of the portable device 20 to a signal with a predetermined frequency.

As one example, when the push button 36 is pressed for the first time, power is supplied to accessories. When the push button 36 is pressed for the second time, the engine starts. When the push button 36 is pressed for the third time, the engine stops. The LED of the display portion 38 is lit when the functional position of the electrical system of the vehicle 2 is switched, for example, to "ACC (accessory)" or "ON (ignition-ON)". This allows the owner to identify the functional position. For example, when the functional position is "ACC" or "ON", the LED is lit. When the functional position is "OFF" (engine stop), the LED is not lit.

A connector 46 extends from one end of the substrate housing 41. Via the connector 46, the switch device 35 provides the vehicle microcomputer 12 with signals, such as a lighting signal for the LED or a demodulated transponder signal. The ring 40 and the substrate housing 41 of the switch holder 34 are resin-molded integrally with each other.

A series of operations performed to start the engine will now be described with reference to FIGS. 1 and 4.

Normally, when the owner holding the portable device 20 enters a predetermined area within the vehicle 2, the portable device 20 automatically transmits an ID code signal in response to a request signal provided from the vehicle controller 10. The vehicle controller 10 of the vehicle 2 receives the ID code signal transmitted from the portable device 20. Then, the vehicle microcomputer 12 compares the two ID codes. Based on the result of the comparison, the vehicle microcomputer 12 determines whether or not to supply the engine starter 18 with a start signal or a stop signal. When the two ID codes match, the vehicle microcomputer 12 validates the operation of the ignition switch 30. In this state, the vehicle microcomputer 12 provides the engine starter 18 with a start signal upon receipt of an ON signal from the ignition switch 30. In response to the start signal, the engine starter 18 starts the stopped engine of the vehicle 2. Alternatively, the vehicle microcomputer 12 provides the engine starter 18 with a stop signal upon receipt of an OFF signal from the ignition switch 30. In response to the stop signal, the engine starter 18 stops the running engine of the vehicle 2.

However, the portable device 20 fails to automatically transmit an ID code signal when its battery is drained. In such a case, the owner places the portable device 20 against the push button 36 of the ignition switch 30 and presses the push button 36 with the portable device 20. In this state, the transponder 25 of the portable device 20 is located within the communication area in which the transponder-driving radio wave is output from the coil antenna 17. The transponder-driving radio wave causes the coil in the transponder 25 to generate electromotive force. The portable device 20 then uses the electromotive force from the coil to provide the vehicle controller 10 with a transponder signal, which includes a transponder code.

When the vehicle controller 10 receives the transponder signal from the portable device 20, the vehicle microcomputer 12 compares the two transponder codes. Based on the result of the comparison, the vehicle microcomputer 12 determines whether or not to provide the engine starter 18 with a start signal or a stop signal. When the two transponder codes match, the vehicle microcomputer 12 validates the operation of the ignition switch 30 to start the stopped engine of the vehicle 2 or to stop the running engine of the vehicle 2.

The security system 1 or the switch device 35 of the preferred the embodiment has the advantages described below.

(1) The push button 36 of the ignition switch 30 is arranged along the inner rim of the coil antenna 17. In this way, the space in the coil antenna 17 is effectively utilized. This structure lays out the ignition switch 30 efficiently and reduces the space occupied by the ignition switch 30 and the coil antenna 17. Thus, the switch device 35 occupies only a small space in the vehicle 2. Further, the appearance of the switch device 35 installed on the instrument panel 3 is improved. The owner is simply required to place the portable device 20 against the push button 36 of the ignition switch 30 in order to cause the transponder 25 of the portable device 20 to generate an electromotive force. In this state, the portable device 20 and the vehicle controller 10 communicate together with the transponder signal, and operation of the ignition switch 30 is validated. Accordingly, a conventional holding mechanism such as a slot for holding the portable device 20 is no longer necessary. Thus, the number of components for the switch device 35 is drastically reduced, and the manufacturing cost of the switch device 35 is reduced.

(2) The switch device 35 is installed in the instrument panel 3 in a state in which the ignition switch 30, the bezel 33, and the switch holder 34 are assembled together. This structure enables the switch device 35 to be downsized. Thus, the space occupied by the switch device 35 is reduced further.

(3) The owner is simply required to place the portable device 20 against the push button 36 and press the push button 36 with the portable device 20 to start the stopped engine of the vehicle 2 or to stop the running engine of the vehicle 2. This means that the owner performs two operations at substantially the same time and the same location, one operation causing mutual communication by a transponder signal between the portable device 20 and the vehicle controller 10 and the other operation pressing the push button 36. Thus, the owner can easily drive or stop the engine of the vehicle 2.

(4) The circuit substrate 42 is arranged in the substrate housing 41 of the switch holder 34. The circuit substrate 42 has the lighting circuit, which controls the lighting of the LED of the display portion 38, and the demodulation circuit, which demodulates the transponder signal transmitted from the transponder 25 to a signal with a predetermined frequency. In this manner, the lighting circuit and the demodulation circuit are both formed on the same circuit substrate 42. Compared with when the two circuits are respectively formed on two separately arranged substrates, the space occupied by the single circuit substrate 42 is small. This structure further downsizes the switch device 35.

(5) The peripheral portion 33a of the bezel 33 furnished with the decorative plating is exposed from the outer rim of the push button 36 of the ignition switch 30. Due to the peripheral portion 33a of the bezel 33, the push button 36 of the ignition switch 30 stands out. This allows the owner to easily recognize the position of the push button 36 of the ignition switch 30 when starting or stopping the engine of the vehicle 2.

It should be apparent to those skilled in the art that the present invention may be embodied in many other specific forms without departing from the spirit or scope of the invention. Particularly, it should be understood that the present invention may be embodied in the following forms.

In the preferred embodiment, the coil antenna 17 that outputs a transponder-driving radio wave is arranged inside the ring 40 of the switch holder 34. As an alternative, an annular recess corresponding to the coil antenna 17 may be formed in the inner surface of the ring 40 of the switch holder 34, and the coil antenna 17 may be arranged in the recess. As another alternative, a coil antenna housing may be provided in the peripheral portion 33a of the bezel 33, and the coil antenna 17 may be arranged in the coil antenna housing. In this case, it is preferable that the surface of the bezel 33 not be furnished with the decorative plating to prevent the plating from blocking the transponder-driving radio wave. Further, a coil antenna housing may be provided in the ignition switch 30, and the coil antenna 17 may be arranged in the coil antenna housing. In this case, it is preferable that a touch-sensitive ignition switch be used instead of the push-button ignition switch 30.

In the preferred embodiment, the switch device 35 includes the ignition switch 30, the bezel 33, and the switch holder 34. As another alternative, the switch device 35 does not have to include the bezel 33 and may include only the ignition switch 30 and the switch holder 34.

As shown in FIG. 5, the circuit substrate 42 and the connector 46 may be arranged inside the ignition switch 30. In this case, the substrate housing 41 is unnecessary. This further downsizes the switch device 55.

In the preferred embodiment, the owner of the vehicle 2 places the portable device 20 against the push button 36 of the ignition switch 30 and presses the push button 36 with the portable device 20. Alternatively, the owner may press the push button 36 with his or her finger while holding the portable device 20 in the vicinity of the push button 36.

In the preferred embodiment, the owner of the vehicle 2 places the portable device 20 against the push button 36 of the ignition switch 30 and presses the push button 36 with the portable device 20 when the portable device 20 does not automatically transmit an ID code signal (when the battery of the portable device 20 is drained). The owner may also perform this switch operation when the portable device 20 automatically transmits an ID code signal (when the battery of the portable device 20 is not drained).

In the preferred embodiment, the starting and stopping of the engine of the vehicle 2 is enabled only when the two transporter codes are determined to be matching. Alternatively, even if the two transponder codes do not match, the running engine of the vehicle 2 may be stopped by operating the ignition switch 30.

In the preferred embodiment, the security system 1 is applied to a smart ignition system for enabling the engine of the vehicle 2 to start based on an ID code signal, and the operation switch corresponds to the ignition switch 30. Alternatively, the security system 1 may be applied to a smart entry system for automatically locking and unlocking the door of the vehicle 2 based on an ID code signal, and the operation switch may correspond to a door switch. The security system 1 may further be applied to an actuating system for driving any in-vehicle electric component, or to a system not relating to the vehicle 2. For example, the security system 1 may be applied to a door lock system for locking and unlocking the door of a house.

The display portion 38 may include a plurality of LEDs with different colors, so that an LED with a different color may be lit according to each functional position of the electrical system. For example, a green LED may be lit when the functional position is "ACC", and a red LED may be lit when the functional position is "ON".

The present examples and embodiments are to be considered as illustrative and not restrictive, and the invention is not to be limited to the details given herein, but may be modified within the scope and equivalence of the appended claims.

What is claimed is:

1. A switch device for use by an operator and connection to an actuator, for enabling the actuator to be driven when an ID code transmitted from a transponder of a portable device matches a predetermined ID code of a vehicle controller, wherein the switch device transmits a transponder-driving radio wave that caused the transponder to generate electromotive force for transmitting the ID code, the switch device comprising:
    a push button switch operated by the operator for driving the actuator; and
    a coil antenna used for transmitting the transponder-driving radio wave, the coil antenna being arranged around the push button switch.

2. The switch device according to claim 1, further comprising:
    a switch holder that holds the push button switch, the coil antenna being attached to the switch holder.

3. The switch device according to claim 2, wherein the push button switch includes a display portion for displaying an operating state of the actuator, the switch device further comprising:
    a single circuit substrate arranged in the switch holder and including a lighting circuit for controlling the display of the display portion and a demodulation circuit for demodulating the transponder signal transmitted from the transponder to a signal with predetermined frequency.

4. The switch device according to claim 1, wherein the push button switch includes a display portion for displaying an operating state of the actuator, the switch device further comprising:
    a single circuit substrate arranged in the push button switch and including a lighting circuit for generating a lighting signal to control the display of the display portion and a demodulation circuit for demodulating the transponder signal transmitted from the transponder to a demodulation signal with a predetermined frequency; and
    a connector arranged in the push button switch, the lighting signal and the demodulation signal being provided to an external device via the connector.

5. A switch device for use by an operator and connection to an actuator, for enabling the actuator to be driven when an ID code transmitted from a transponder of a portable device matches a predetermined ID code of a vehicle controller, wherein the switch device transmits a transponder-driving radio wave that causes the transponder to generate electromotive force for transmitting the ID code, the switch device comprising:
    a push button switch having an operational surface operated by the operator for driving the actuator; and
    a coil antenna used for transmitting the transponder-driving radio wave the coil antenna being arranged around the operational surface.

6. A switch device for use by an operator and connection to an actuator, for enabling the actuator to be driven when an ID code transmitted from a transponder of a portable device matches a predetermined ID code of a vehicle controller, wherein the switch device transmits a transponder-driving radio wave that causes the transponder to generate electromotive force for transmitting the ID code, the switch device comprising:
    a push button switch having an operational surface operated by the operator for driving the actuator;
    a switch holder, having a ring that surrounds the operational surface, for holding the push button switch; and
    a coil antenna used for transmitting the transponder-driving radio wave, the coil antenna being arranged near the operational surface of the push button switch and in the ring.

7. A security system for use by an operator and for controlling driving of an actuator, the security system enabling the actuator to be driven when an ID code transmitted from a transponder matches a predetermined ID code, wherein the security system transmits a transponder-driving radio wave that causes the transponder to generate electromotive force for transmitting the ID code, the security system comprising:
- a portable device including the transponder;
- a push button switch operated by the operator to drive the actuator; and
- a coil antenna used for transmitting the transponder-driving radio wave, the coil antenna being arranged around the push button switch.

8. A security system for use by an operator and for controlling driving of an actuator, the security system comprising:
- a push button switch operated by the operator for driving the actuator;
- a request signal output unit for transmitting a request signal;
- a portable device including a transponder for transmitting a transponder signal including a first ID code, the security system enabling the actuator to be driven when the first ID code transmitted from the transponder matches a predetermined second ID code, wherein the security system transmits a transponder-driving radio wave that causes the transponder to generate electromotive force for transmitting the first ID code, the portable device transmitting an ID code signal including a third ID code in response to the request signal transmitted from the request signal output unit
- a first determination unit for determining whether the third ID code included in the ID code signal transmitted from the portable device matches a preset fourth ID code;
- a first control unit for enabling the actuator to be driven when the first determination unit determines that the third ID code and the fourth ID code match;
- a second determination unit for determining whether the first ID code included in the transponder signal transmitted from the transponder of the portable device matches the second ID code;
- a second control unit for enabling the actuator to be driven when the second determination unit determines that the first ID code and the second ID code match; and
- a coil antenna used to transmit the transponder-driving radio wave, the coil antenna being arranged around the push button switch.

9. A method for operating a push button switch to drive an actuator, wherein the actuator is enabled to be driven when an ID code transmitted from a transponder of a portable device matches a predetermined ID code, the transponder receiving a transponder-driving radio wave that generates electromotive force used to transmit the ID code, the method comprising:
- operating the push button switch, which has a coil antenna that outputs the transponder-driving radio wave and is arranged around the push button switch, while holding the portable device in a vicinity of the push button switch.

10. The method according to claim 9, wherein the push button switch has an operational surface that is pressed, said operating the push button switch includes placing the portable device against the operational surface of the push button switch and pressing the operation switch with the portable device.

* * * * *